US011589223B2

(12) United States Patent
Takeuchi

(10) Patent No.: US 11,589,223 B2
(45) Date of Patent: Feb. 21, 2023

(54) TERMINAL DEVICE AND NON-TRANSITORY COMPUTER-READABLE RECORDING MEDIUM STORING COMPUTER READABLE INSTRUCTIONS FOR TERMINAL DEVICE

(71) Applicant: BROTHER KOGYO KABUSHIKI KAISHA, Nagoya (JP)

(72) Inventor: Syun Takeuchi, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 198 days.

(21) Appl. No.: 16/939,202

(22) Filed: Jul. 27, 2020

(65) Prior Publication Data

US 2021/0037382 A1     Feb. 4, 2021

(30) Foreign Application Priority Data

Jul. 31, 2019 (JP) .............................. JP2019-140732

(51) Int. Cl.
*H04W 12/06* (2021.01)
*H04L 9/30* (2006.01)
*H04W 76/10* (2018.01)

(52) U.S. Cl.
CPC .............. *H04W 12/06* (2013.01); *H04L 9/30* (2013.01); *H04W 76/10* (2018.02)

(58) Field of Classification Search
CPC ....... H04L 29/06; H04L 63/06; H04L 63/061; H04L 63/062; H04L 63/08; H04W 12/06;
(Continued)

(56) References Cited

U.S. PATENT DOCUMENTS 10,009,842 B2 * 6/2018 Jeanne ............... H04W 52/0212
11,044,770 B2 * 6/2021 Suzuki .................. H04W 12/04
(Continued)

FOREIGN PATENT DOCUMENTS

JP      2017-028460 A      2/2017
WO  WO-2019225941 A1 * 11/2019

OTHER PUBLICATIONS

Device Provisioning Protocol Specification Version 1.1, Wi-fi Alliance (Year: 2018).*
(Continued)

*Primary Examiner* — Matthew C Sams
(74) *Attorney, Agent, or Firm* — Scully Scott Murphy and Presser

(57) ABSTRACT

A terminal device may determined whether the terminal device has been established a wireless connection with an access point. In a case where it is determined that the terminal device has been established the wireless connection with the access point, the terminal device may send first connection information to the communication device, the first connection information being for establishing a wireless connection between the communication device and the access point. In a case where it is determined that the terminal device has not been established the wireless connection with the access point, the terminal device may communicate second connection information with the communication device, the second connection information being for establishing a wireless connection between the terminal device and the communication device not via the access point.

8 Claims, 11 Drawing Sheets

(58) Field of Classification Search
CPC ..... H04W 8/005; H04W 84/12; H04W 12/04; H04W 12/0431; H04W 12/069; H04W 12/35; H04W 12/50; H04W 12/55; H04W 4/23; H04W 4/50; H04W 4/70; H04W 4/80; H04W 76/18; H04W 76/34; G06F 3/1204; G06F 3/1231; G06F 3/1236
See application file for complete search history.

(56) References Cited

U.S. PATENT DOCUMENTS

| | | | |
|---|---|---|---|
| 11,265,962 B2* | 3/2022 | Miyake | H04W 76/18 |
| 11,395,137 B2* | 7/2022 | Shibata | H04L 9/0841 |
| 11,399,399 B2* | 7/2022 | Suzuki | H04W 12/06 |
| 2017/0295448 A1* | 10/2017 | McCann | H04W 12/06 |
| 2018/0109381 A1* | 4/2018 | Cammarota | H04L 9/0894 |
| 2018/0213578 A1 | 7/2018 | Tachibana | |
| 2020/0396584 A1* | 12/2020 | Jo | H04W 8/005 |

OTHER PUBLICATIONS

Device Provisioning Protocol Technical Specification Version 1.1, Wi-Fi Alliance, 2018, pp. 1-124.
Wi-Fi Peer-to-Peer (P2P) Technical Specification Version 1.1, pp. 1-159.
Draft Device Provisioning Protocol Technical Specification Version 0.2.11, Wi-Fi Alliance, 2017, pp. 1-133.

* cited by examiner (Overview of DPP)

(Case B)

TERMINAL DEVICE AND NON-TRANSITORY COMPUTER-READABLE RECORDING MEDIUM STORING COMPUTER READABLE INSTRUCTIONS FOR TERMINAL DEVICE

CROSS-REFERENCE TO RELATED APPLICATION

This application claims priority to Japanese Patent Application No. 2019-440732, filed on Jul. 31, 2019, the entire contents of which are incorporated herein by reference.

TECHNICAL FIELD

The description herein discloses an art for establishing a wireless connection between a communication device and another device by executing an establishment process of a terminal device.

BACKGROUND

A Device Provisioning Protocol (hereinafter termed "DPP"), which is a wireless communication protocol established by Wi-Fi Alliance, is known. The DPP is a wireless communication protocol for easily establishing a wireless connection between a pair of devices. More specifically, according to the DPP, a first device (that is, "Configurator") sends information of an access point a second device (that is, "Enrollee"). Accordingly, a wireless connection between the second device and the access point may be established by using the information of the access point.

SUMMARY

The description herein discloses an art for establishing a wireless connection between a communication device and another device by executing an establishment process of a terminal device according to a process that is different from conventional processes.

A terminal device disclosed herein may comprise a wireless interface configured to execute wireless communication according to Wi-Fi standard; and a controller configured to: obtain a public key of a communication device; determine whether the terminal device has been established a wireless connection with an access point different from the communication device; send an authentication request in which the public key is used to the communication device via the wireless interface; receive an authentication response from the communication device via the wireless interface; in a case where it is determined that the terminal device has been established the wireless connection with the access point, send first connection information to the communication device via the wireless interface after the authentication response has been received from the communication device, the first connection information being for establishing a wireless connection between the communication device and the access point; in a case where it is determined that the terminal device has not been established the wireless connection with the access point, communicate second connection information with the communication device via the wireless interface after the authentication response has been received from the communication device, the second connection information being for establishing a wireless connection between the terminal device and the communication device not via the access point; and establish the wireless connection between the terminal device and the communication device by using the second connection information via the wireless interface after the second connection information has been communicated with the communication device.

Another terminal device disclosed herein may comprise a wireless interface configured to execute wireless communication according to Wi-Fi standard; and a controller configured to: obtain a public key of a communication device; execute a process for shifting a state of the wireless interface from a state in which the wireless interface is unable to execute the wireless communication via the wireless interface to a state in which the wireless interface is able to execute the wireless communication via the wireless interface; send an authentication request in which the public key is used to the communication device via the wireless interface after the state of the wireless interface has been shifted to the state in which the wireless interface is able to execute the wireless communication; receive an authentication response from the communication device via the wireless interface; communicate connection information with the communication device via the wireless interface after the authentication response has been received from the communication device, the connection information being for establishing a wireless connection between the terminal device and the communication device not via an access point; and establish the wireless connection between the terminal device and the communication device by using the connection information via the wireless interface after the connection information has been communicated with the communication device.

A control method and a computer program for realizing the aforementioned terminal device, as well as a computer-readable recording medium storing the computer program are also novel and useful. Further, a communication system provided with the aforementioned terminal device and another device (such as a communication device) is also novel and useful.

DETAILED DESCRIPTION

Figure 1:
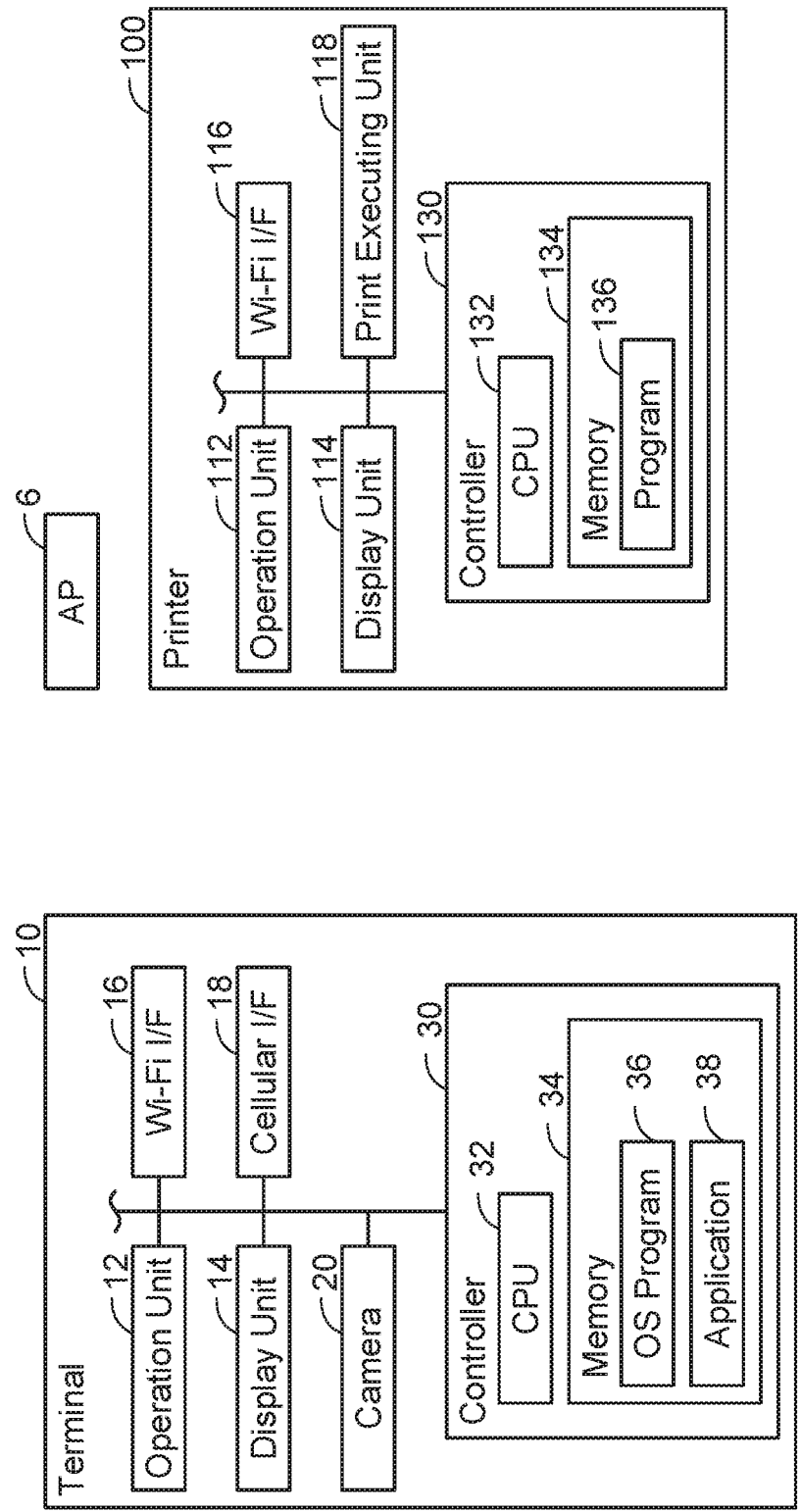
FIG. 1 shows a configuration of a communication system.

Configuration of Communication System 2; FIG. 1

As shown in FIG. 1, a communication system 2 comprises an Access Point (AP) 6, a terminal 10, and a printer 100. In this embodiment, a situation is assumed in which a user uses the terminal 10 to establish a Wi-Fi connection, that is a wireless connection according to Wi-Fi standard, between the printer 100 and another device (e.g. the AP 6 or the terminal 10).

Configuration of Terminal 10

The terminal 10 is a mobile terminal device such as a cellphone (such as a smartphone), PDA, a table PC. In an variant, the terminal 10 may be a stationary PC, or a laptop PC. The terminal 10 is provided with an operation unit 12 a display unit 14, a Wi-Fi interface 16, a cellular interface 18, a camera 20 and a controller 30. The respective units 12 to 30 are connected to a bus line (for which a reference sign is not given). Hereinafter, an interface will be abbreviated to "I/F".

The operation unit 12 includes plurality of keys. The operation unit 12 enables the user to input various instructions to the terminal 10. The display unit 14 is a display configured to display various types of information. The display unit 14 may also include a touchscreen function (i.e. operation unit) which receives instructions from the user.

The Wi-Fi I/F 16 is a wireless interface configured to execute Wi-Fi communication according to the Wi-Fi standard. The Wi-Fi standard is a wireless communication standard for executing wireless communication according to 802.11 standard of the Institute of Electrical and Electronics Engineers, Inc. (IEEE) and standards complying thereto (such as 802.11a, 11b, 11g, 11n, 11ac, etc.), for example. The Wi-Fi I/F 16 is set to either ON or OFF state. The state of the Wi-Fi I/F 16 being ON is a state being able to execute communication according to the Wi-Fi protocol (e.g. send or receive a Probe Request, send a DPP Authentication Request). The state of the Wi-Fi I/F 16 being OFF is a state of being unable to execute the above communications (e.g. a state in which power supply to the Wi-Fi I/F 16 is stopped).

The Wi-Fi I/F 16 supports a Device Provisioning Protocol (DPP) that is established by Wi-Fi Alliance. The DPP is described in the standard "Device Provisioning Protocol Technical Specification Version 1.1" created by Wi-Fi Alliance, and is a connection protocol for easily establishing a Wi-Fi connection between a pair of devices by executing an establishment process of the terminal 10. Hereinafter, the established Wi-Fi connection in accordance with the DPP may be termed "DPP connection".

Further, the Wi-Fi I/F 16 supports Wi-Fi DIRECT (WFD) (Registered Trademark, Wi-Fi Alliance) established by Wi-Fi Alliance. The WFD is a connection protocol described in the standard "Wi-Fi Peer-to-Peer (P2P) Technical Specification Version 1.1" created by Alliance. In the WFD, Group Owner state (called "G/O state" below) and Client state (called "CL state" below) are defined. Further, a state which different from both the G/O state and the CL state calls "device state" herein. The device which supports the WFD is capable of selectively operating in one of the above three states. Hereinafter, the established Wi-Fi connection in accordance with the WFD may be termed "WFD connection".

Further, the terminal 10 can establish the Wi-Fi connection with the AP 6 in accordance with a certain Wi-Fi protocol which is different from both the DPP and the WFD. Specifically, the terminal 10 can establish the Wi-Fi connection with the AP 6 by using the Service Set Identifier (SSID) of the wireless network formed by the AP 6 and password in the certain Wi-Fi protocol. Hereinafter, the established Wi-Fi connection in accordance with the certain Wi-Fi protocol may be termed "certain Wi-Fi connection". Further, hereinafter, DPP connection with the AP 6 and the certain Wi-Fi connection with the AP 6 collectively may be termed "AP connection".

The cellular I/F 18 is a wireless interface for executing cellular communication according to a cellular protocol. The cellular protocol is a wireless communication protocol in which an area is divided into predetermined sections (i.e., cells), and a base station arranged in each cell is used. The cellular protocol includes 3G, 4G, and 5G defined by International Telecommunication Union.

The cellular I/F 18 is normally connected to one of the base stations, and the terminal 10 is capable of executing cellular communication via the cellular I/F 18. However, the terminal 10 executes the Wi-Fi communication with priority over the cellular communication when a state of the Wi-Fi I/F 16 is ON and the Wi-Fi connection (i.e., the WFD connection or the AP connection) is currently established. On the other hand, when the state of the Wi-Fi I/F 16 is ON but no Wi-Fi connection is currently established, the terminal 10 executes the cellular communication. Further, when the state of the Wi-Fi 16 is OFF, the terminal 10 executes the cellular communication. That is, any state in which the Wi-Fi connection is not currently established can be rephrased as a state in which the terminal 10 executes the cellular communication.

The camera 20 is a device for capturing an image of an object, and in this embodiment, it is used to capture a QR Code (Registered Trademark, Denso Wave Incorporated Corporation) for the AP 6 and the printer 100.

The controller 30 includes a CPU 32 and a memory 34. The CPU 32 is configured to execute various processes according to a program 36 and 38 stored in the memory 34. The memory 34 is constituted of a volatile memory, a nonvolatile memory and/or the like and stores the OS program 36 and application 38 (hereinafter termed simply as "app 38")

The OS program 36 is a program for controlling basic operation of the terminal 10. The app 37 is a program for establishing the Wi-Fi connection between the printer 100 and the other device (e.g. the AP 6 or the terminal 10) by executing an establishment process of the terminal device 10. The app 38 may be installed to the terminal 10, for example, from a server on the Internet provided by a vendor of the printer 100.

Configuration of Printer 100

The printer 100 is a peripheral device (e.g., a peripheral device working with the terminal 10) that is capable of executing a print function. The printer 100 is provided with an operation unit 112, a display unit 114, a Wi-Fi I/F 116, a print executing unit 118, and a controller 130. The respective units 112 to 130 are connected to a bus line (for which a reference sign is not given).

The operation unit 112 includes a plurality of keys. The operation unit 112 enables the user to input various instructions to the printer 100. The display unit 114 is a display configured to display various types of information. The print executing unit 118 includes a printing engine such as an inkjet technology or a laser technology.

The Wi-Fi I/F 116 supports both the DPP and the WFD. Due to this, the printer 100 is capable of establishing the DPP connection with the AP 6 and capable of establishing the WFD connection with the terminal 10. Further, the printer 100 is also capable of establishing the certain Wi-Fi connection with the AP 6.

The controller 130 includes a CPU 132 and a memory 134. The CPU 132 is configured to execute various processes according to a program 136 stored in the memory 134. The memory 134 may be a volatile memory, a non-volatile memory and/or the like.

Figure 2:
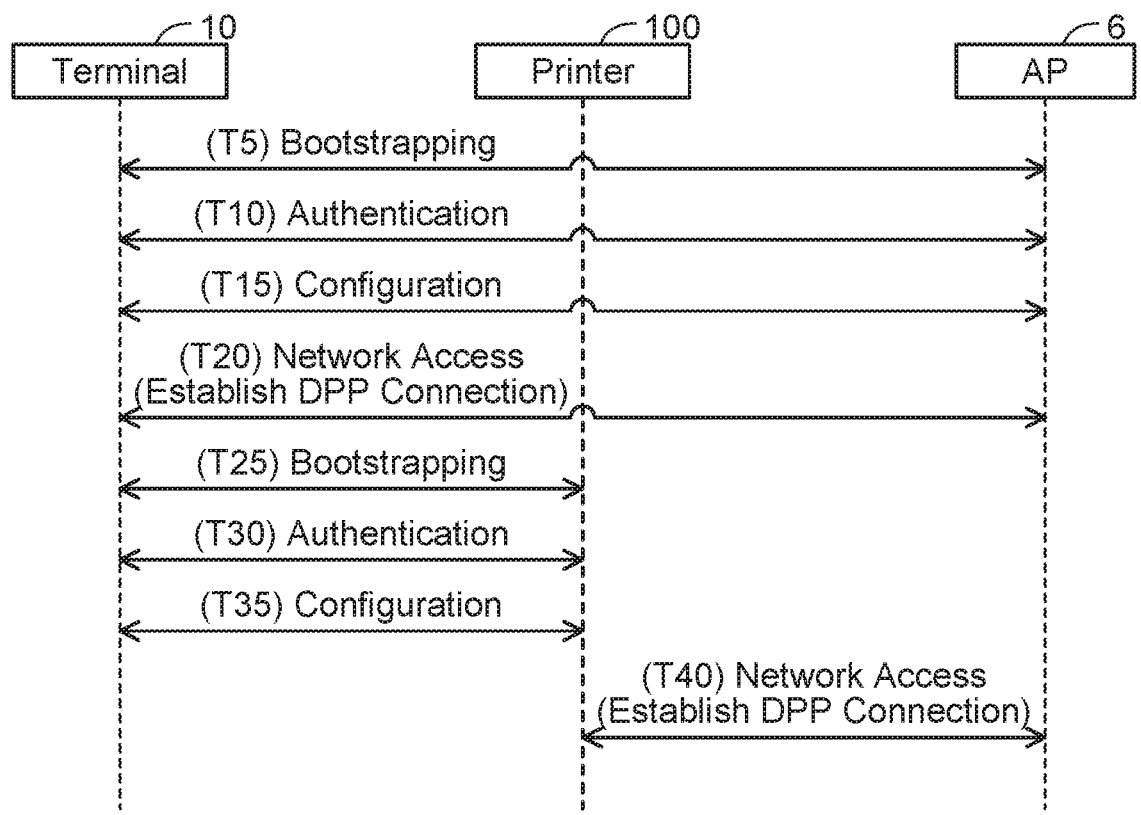
FIG. 2 shows a schematic sequence diagram of a process for establishing a Wi-Fi connection according to a DPP between a printer and an access point.

Overview of the DPP; FIG. 2

Next, an overview of the DPP will be described with reference to FIG. 2. The AP 6 also supports the DPP. In this embodiment, the DPP connection between the printer 100 and the AP 6 is established by each of the devices 6, 10, 100 executing communication according to the DPP. Hereinafter, to facilitate understanding, operations which CPUs (such as the CPU 32, 132) of the respective devices execute will be described with the devices (such as the terminal 10, the printer 100) as subjects of action instead of describing the operations with the CPUs as the subjects of action.

In T5, the terminal 10 executes Bootstrapping (hereinafter abbreviated to "BS") according to the DPP with the AP 6. The BS is a process of providing information that is to be used in Authentication (hereinafter abbreviated to "Auth") of T10 (to be described later) from the AP 6 to the terminal 10 in response to a QR Code adhered to the AP 6 being captured by the terminal 10.

In T10, the terminal 10 executes Auth according to the DPP with the AP 6 by using the information obtained in the BS of T5. The Auth is a process for the terminal 10 and the AP 6 to authenticate each other.

In T15, the terminal 10 executes Configuration (hereinafter abbreviated to "Config") according to the DPP with the AP 6. The Config is a process of sending information for the AP 6 establishing the DPP connection to the AP 6. Specifically, in the Config, the terminal 10 generates a Configuration Object (hereinafter, Configuration Object is abbreviated to "CO") for AP (hereafter AP-CO), and sends the AP-CO to the AP 6. As a result, the AP-CO is stored in the AP 6.

In T20, the terminal 10 executes Network Access (hereinafter abbreviated to "NA") according to the DPP with the AP 6. The terminal 10 generates a CO for terminal (hereafter terminal-CO) and stores the terminal-CO in the memory 34 in the NA. The terminal 10 and the AP 6 share a connection key for establishing the DPP connection between the terminal 10 and the AP 6 by using the terminal-CO and the AP-CO. Then, the terminal 100 and the AP 6 execute 4way-handshake communication. In at least a part of the 4way-handshake communication, the terminal 10 and the AP 6 communicate encrypted information encrypted by the shared connection key. Further, in a case where decryption of the encrypted information is successful, the DPP connection is established between the terminal 10 and the AP 6. Thus, the terminal 10 can participate, as a child station, in a wireless network formed by the AP 6. In a variant, the terminal 10 and the AP 6 may execute Simultaneous Authentication of Equals (SAE, also called "Dragonfly") communication, instead of the 4way-handshake communication.

Next, the terminal 10 executes BS according to the DPP with the printer 100 in T25. The BS is a process of providing information that is to be used in Auth of T30 (to be described later) from the printer 100 to the terminal 10 in response to a QR Code displayed in the printer 100 being captured by the terminal 10.

In T30, the terminal 10 executes Auth according to the DPP with the printer 100 by using the information obtained in the BS of T25. The Auth is a process for the terminal 10 and the printer 100 to authenticate each other.

In T35, the terminal 10 executes Config according to the DPP with the printer 100. The Config is a process of sending information for establishing the DPP connection between the printer 100 and the AP 6 to the printer 100. In this Config, the terminal 10 generates a CO for printer (hereafter "printer-CO") for establishing the DPP connection between the printer 100 and the AP 6, and sends the printer-CO to the printer 100. As a result, the printer-CO is stored in the printer 100.

In T40, the printer 100 and the AP 6 execute the NA by using the stored AP-CO and printer-CO and share a connection key. After this, the printer 100 and the AP 6 execute 4way-handshake communication and communicate encrypted information encrypted by the shared connection key. As a result, the DPP connection is established between the printer 100 and the AP 6. Thus, the printer 100 can participate, as a child station, in a wireless network formed by the AP 6. That is, a situation in which the terminal 10 and the printer 100 both belong to a same wireless network formed by the AP 6 is established. Due to this, the terminal 10 and the printer 100 can execute communication of data, for example representing a print target image via the AP 6.

In the DPP, the user does not need to input information of the wireless network (such as Service Set Identifier (SSID) and password) in which the AP 6 operates as a parent station to the terminal 10 or the printer 100 in order to establish the Wi-Fi connection (i.e. the DPP connection) between the AP 6 and the terminal 10/the printer 100. As such, the user can easily establish the connection between the AP 6 and the terminal/the printer 100.

Description on Respective Processes; FIGS. 3 to 6

Next, details of the respective processes executed in T25 to T40 of FIG. 2 will be described with reference to FIGS. 3 to 6. Since the processes of T5 to T15 are similar to the processes of T25 to T35 except that the AP 6 is used instead of the printer 100, the detailed description thereof will be omitted. Further, since the process of T20 is similar to the process of T40 except that the process of T20 is a process between the terminal 10 and the AP 6, the detailed description thereof be omitted.

Figure 3:
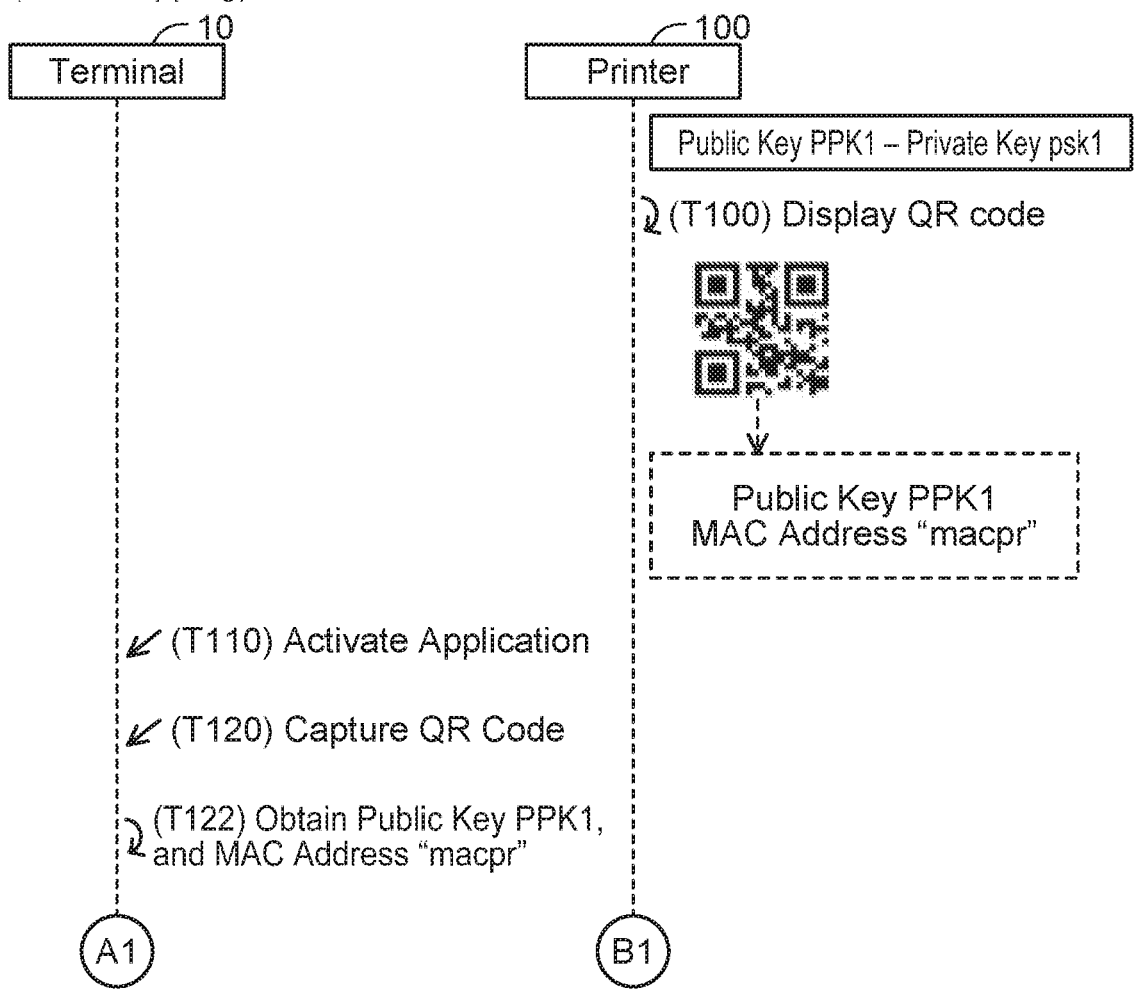
FIG. 3 shows a sequence diagram of a Bootstrapping process.

Bootstrapping (BS); FIG. 3

Firstly, the process of the BS executed between the terminal 10 and the printer 100 in 125 of FIG. 2 will be described with reference to FIG. 3. In an initial state of FIG. 3, the memory 134 of the printer 100 stores a public key PPK1 of the printer 100 and a private key psk1 of the printer 100 in advance.

In response to accepting an operation by the user, the printer 100 causes the display unit 114 to display a QR Code in T100. This QR Code is obtained by coding the public key PPK1 of the printer 100 and the MAC address "macpr" of the Wi-Fi I/F 116 of the printer 100. In a variant, the above QR Code may be adhered to a housing of the printer 100 and/or may be attached to a leaflet (an instruction manual) of the printer 100.

Figure 4:
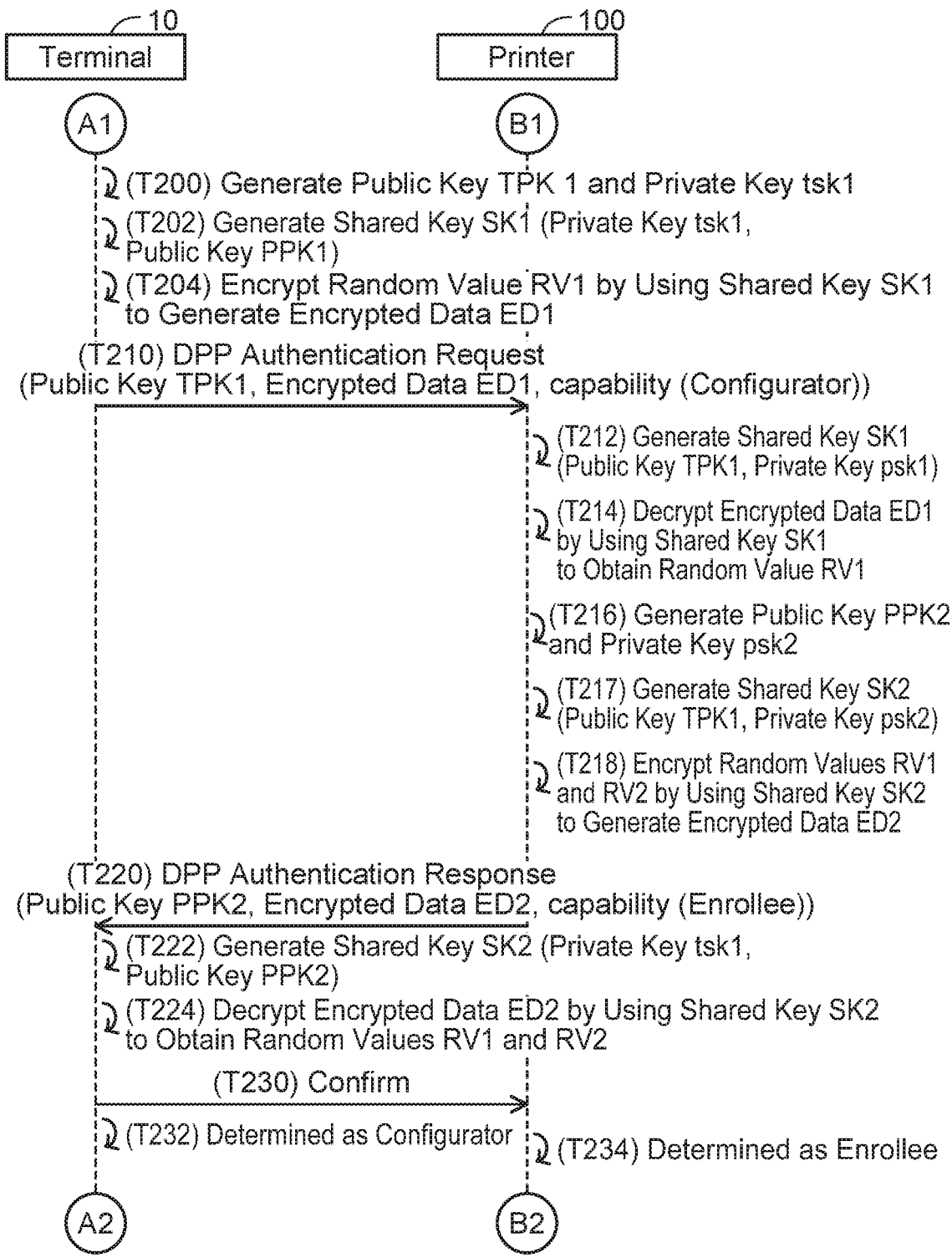
FIG. 4 shows a sequence diagram of an Authentication process.

In T110, the user activates the app 38 installed to the terminal 10. The terminal 10 activates the camera 20 in response to the app 38 being activated, and captures the QR Code displayed on the printer 100 by using the camera 20 in T120. Further, in T122, the terminal 10 decodes the captured QR Code and obtains the public key PPM and the MAC address "macpr". When the process of T122 is completed, the process of FIG. 3 is terminated Authentication (Auth); FIG. 4

Next, the process of the Auth executed between the terminal 10 and the printer 100 in T30 of FIG. 2 will be described with reference to FIG. 4.

In T200, the terminal 10 generates a public key TPK1 and a private key tsk1 of the terminal 10. Next, in T202, the terminal 10 generates a shared key SK1 according to Elliptic curve Diffie-Hellman key exchange (ECDH) by using the generated private key tsk1 and the public key PPK1 of the printer 100 obtained in T122 of FIG. 3. Then, in 1204, the terminal 10 generates encrypted data ED1 by using the generated shared key SK1 to encrypt a random value RV1.

In T210, the terminal 10 sends an Authentication Request (hereinafter abbreviated to "AReq") via the Wi-Fi I/F 16 to the printer 100 by setting the MAC address "macpr" obtained in T122 of FIG. 3 as its destination. The AReq is a signal for requesting the printer 100 to execute authentication. The AReq includes the public key TPK1 of the terminal 10 generated in T200, the encrypted data ED1 generated in T204, and a capability of the terminal 10.

The capability is information that is pre-designated in a device supporting the DPP, and includes any one of the following values: a value indicating that this device is capable of operating only as a Configurator according to the DPP, a value indicating that this device is capable of operating only as an Enrollee according to the DPP, and a value indicating that this device is capable of operating whichever one of the Configurator and the Enrollee. The Configurator refers to a device configured to send a CO used in the NA (T40 of FIG. 2) to an Enrollee in the Config (T35 of FIG. 2). On the other hand, the Enrollee refers to a device that receives the CO used in the NA from the Configurator in the Config. As above, in this embodiment, the terminal 10 generates the AP-CO and the printer-CO and sends them respectively to the AP 6 and the printer 100. As such, the capability of the terminal 10 includes the value indicating that it is capable of operating only as the Configurator.

The printer 100 receives the AReq from the terminal 10 via the Wi-Fi I/F 116 in T210. As above, this AReq is sent with the MAC address "macpr" of the printer 100 as the destination. As such, the printer 100 can suitably receive this AReq from the terminal 10.

Next, the printer 100 executes following processes for authenticating the sender of the AReq (that is, the terminal 10). Specifically, firstly, in T212, the printer 100 generates a shared key SK1 according to the ECDH by using the public key TPK1 of the terminal 10 in the AReq and the private key psk1A of the printer 100. Here, the shared key SK1 generated by the terminal 10 in T202 and the shared key SK1 generated by the printer 100 in T212 are identical to each other. Thus, the printer 100 can suitably decrypt the encrypted data ED1 in the AReq by using the generated shared key SK1 in T214, as a result of which the printer 100 can obtain the random value RV1. In a case where the decryption of the encrypted data ED1 succeeds, the printer 100 determines that the sender of the AReq is the device that captured the QR Code displayed on the printer 100, that is, determines that the authentication succeeded, and executes subsequent processes from T216. On the other hand, in a case where the decryption of the encrypted data ED1 does not succeed, the printer 100 determines that the sender of the AReq is not the device that captured the OR Code displayed on the printer 100, that is, determines that the authentication failed, and does not execute the subsequent processes from T216.

In T216, the printer 100 generates a new public key PPK2 and a new private key psk2 of the printer 100. In a variant, the public key PPK2 and the private key psk2 may be stored in advance in the printer 100. Next, in T217, the printer 100 generates a shared key SK2 according to the ECDH by using the public key TPK1 of the terminal 10 in the AReq of T210 and the generated private key psk2 of the printer 100. Then, in T218, the printer 100 generates encrypted data ED2 by using the generated shared key SK2 to encrypt the obtained random value RV1 and a new random value RV2.

In T220, the printer 100 sends an Authentication Response (hereinafter abbreviated to "ARes") to the terminal 10 via the Wi-Fi I/F 116. This ARes includes the public key PPK2 of the printer 100 generated in T216, the encrypted data ED2 generated in T218, and a capability of the printer 100. This capability includes the value indicating that the printer 100 is capable of operating only as the Enrollee.

In response to receiving the ARes from the printer 100 via the Wi-Fi I/F in T220, the terminal 10 executes following processes for authenticating the sender of the ARes (that is, the printer 100). Specifically, firstly in T222, the terminal 10 generates a shared key SK2 according to the ECDH by using the private key tsk1 of the terminal 10 generated in T200 and the public key PPK2 of the printer 100 in the ARes. Here, the shared key SK2 generated by the printer 100 in T217 and the shared key SK2 generated by the terminal 10 in T222 are identical to each other. Thus, the terminal 10 can suitably decrypt the encrypted data ED2 in the ARes by using the generated shared key SK2 in T224, as a result of which the terminal 10 can obtain the random values RV1 and RV2. In a case where the decryption of the encrypted data ED2 succeeds, the terminal 10 determines that the sender of the ARes is the device that displayed the captured QR Code, that is, determines that the authentication succeeded, and executes subsequent processes from T230. On the other hand, in a case where the decryption of the encrypted data ED2 does not succeed, the terminal 10 determines that the sender of the ARes is not the device that displayed the captured QR Code, that is, determines that the authentication failed, and does not execute the subsequent processes from T230.

In T230, the terminal 10 sends a Confirm to the printer 100 via the Wi-Fi I/F 16. The Confirm includes information indicating that the terminal 10 operates as the Configurator and the printer 100 operates as the Enrollee. As a result, the terminal 10 determines to operate as the Configurator in T232, and the printer 100 determines to operate as the Enrollee in T234. When the process of T234 is completed, the process of FIG. 4 is terminated.

Figure 5:
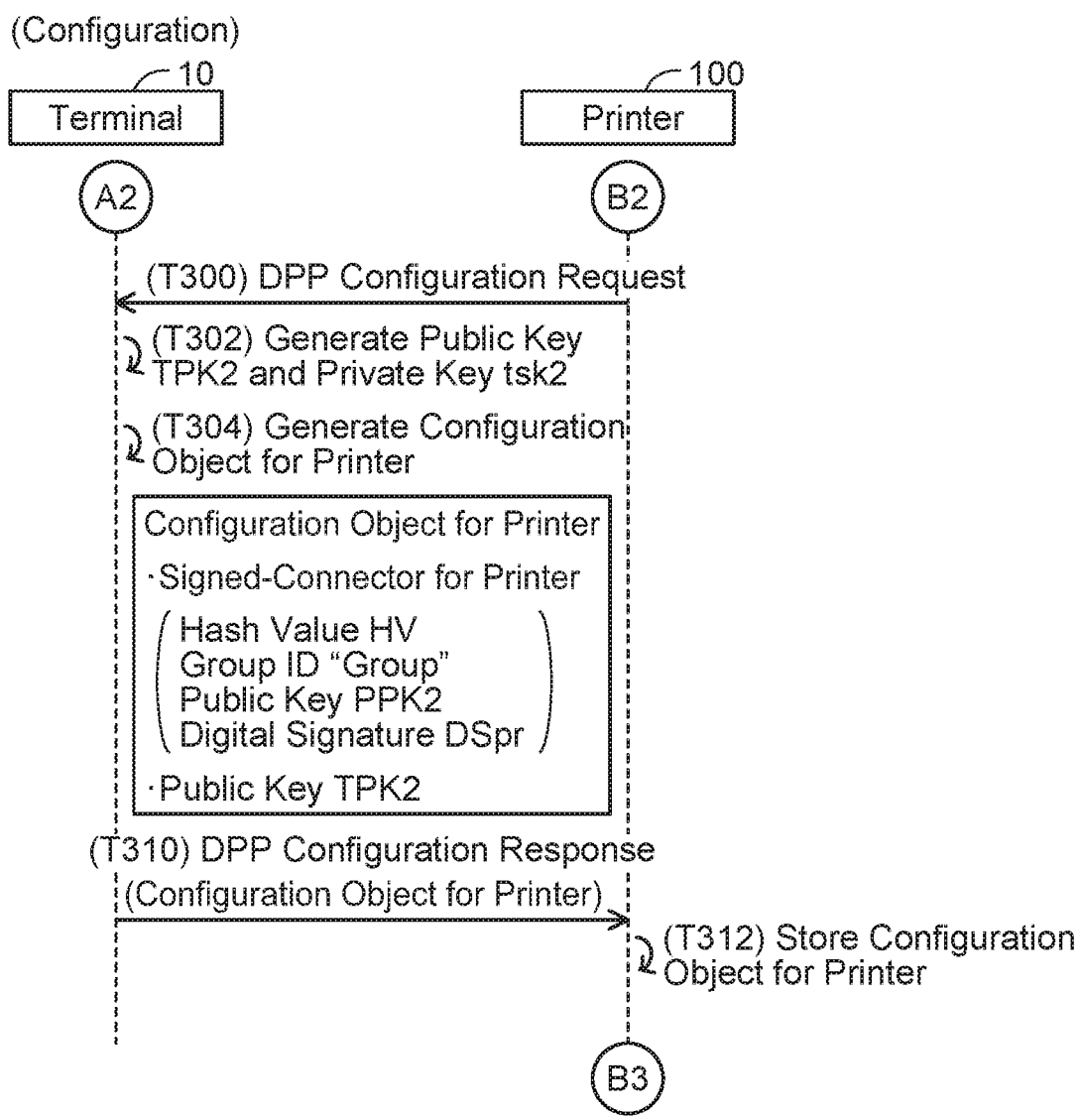
FIG. 5 shows a sequence diagram of a Configuration process.

Configuration (Config); FIG. 5

Next, the process of the Config executed between the terminal 10 and the printer 100 in T135 of FIG. 2 will be described with reference to FIG. 5.

In T300, the printer 100 sends a DIP Configuration Request (hereinafter abbreviated to "CReq") to the terminal 10 via the Wi-Fi I/F 116. This CReq is a signal requesting the printer-CO to be sent.

The terminal 10 receives the CReq from the printer 100 in T300 via the Wi-Fi I/F 16. In this ease, the terminal 10 generates a new public key TPK2 and a new private key tsk2 of the terminal 10 in T302. Next, in T304, the terminal 10 generates the printer-CO by using the generated private key tsk2. Specifically, the terminal 10 executes following processes.

Firstly, the terminal 10 generates a hash value by hashing the public key TPK2 of the terminal 10. Further, the terminal 10 generates a specific value by hashing a combination of the hash value HV, the group ID "Group", and the public key PPK2 of the printer 100 in the ARes in T220 of FIG. 4. Then, the terminal 10 generates a digital signature DSpr by using the private key tsk2 of the terminal 10 to encrypt the generated specific value in accordance with an Elliptic Curve Digital Signature Algorithm (ECDSA). As a result, the terminal 10 can generate a Signed-Connector for printer (hereinafter, the Signed-Connector is abbreviated to "SC") including the hash value HV, the group ID "Group", the public key PPK2 of the printer 100, and the digital signature DSpr. Further, the terminal 10 generates the printer-CO including the SC for printer (hereafter, "printer-SC") and the public key TPK2 of the terminal 10.

In T310, the terminal 10 sends a DPP Configuration Response (hereinafter abbreviated to "CRes") including the printer-CO to the printer 100 via the Wi-Fi I/F 16.

The printer 100 receives the CRes from the terminal 10 in T310 via the Wi-Fi I/F 116. In this ease, the printer 100 stores the printer-CO in the CRes in T312. The printer-CO is information that is to be used in the DPP connection with the AP 6 and can be called connection information for establishing the DPP connection with the AP 6. When the process of T312 is completed, the process of FIG. 5 is terminated.

Figure 6:
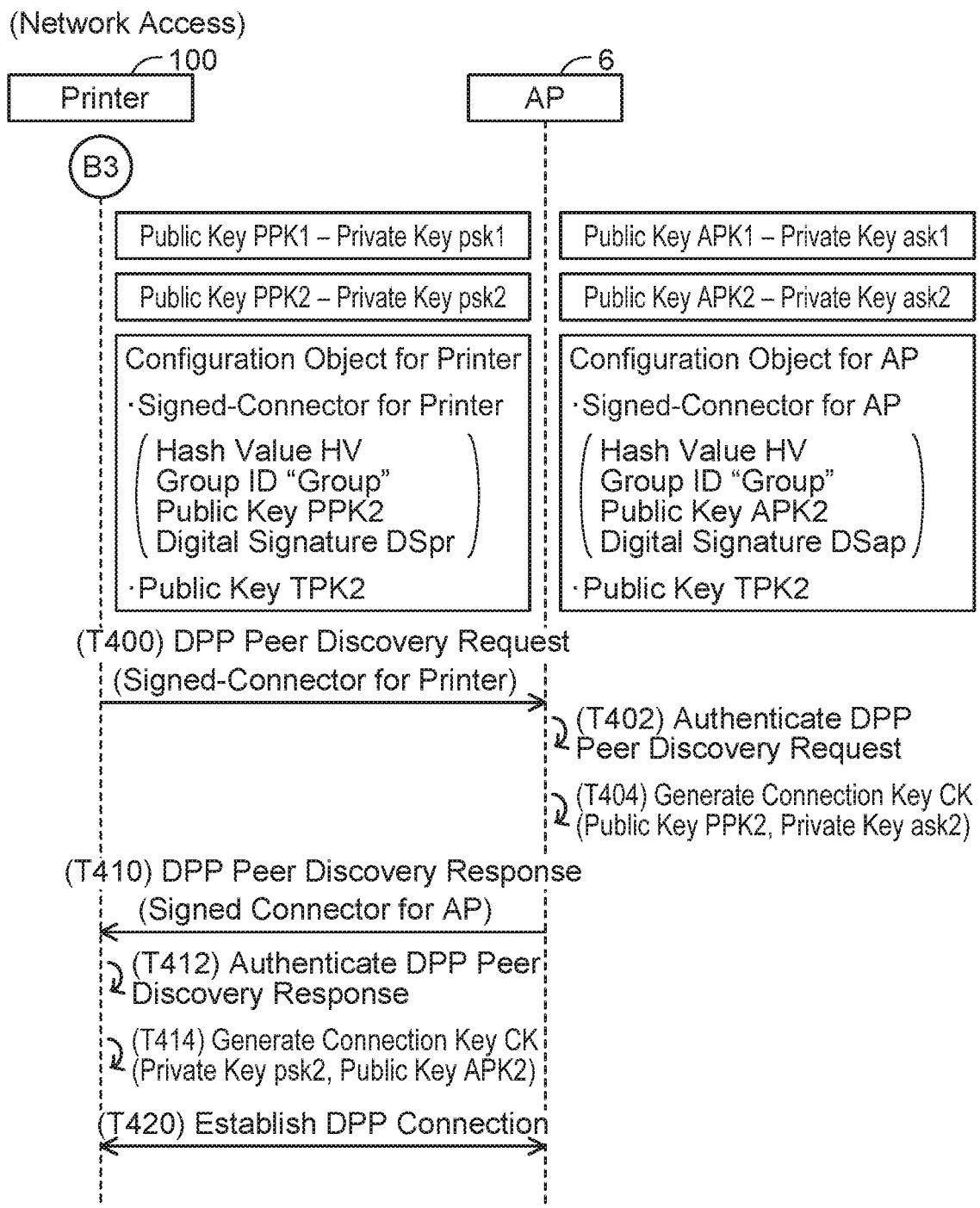
FIG. 6 shows a sequence diagram of a Network Access process.

Network Access (NA); FIG. 6

Next, the process of the NA in T40 of FIG. 2 executed between the printer 100 and the AP 6 will be described with reference to FIG. 6. As aforementioned, the processes of T5 to T15 of FIG. 2 have already been executed between the terminal 10 and the AP 6, similarly to T25 to T35 of FIG. 2. The AP 6 stores in advance a public key APK1 and a private key ask1 of the AP 6. Further, a QR Code, which is obtained by coding the public key APK1 of the AP 6 and a MAC address of the AP 6, has been adhered to a housing of the AP 6. Processes similar to the processes from T200 of FIG. 4 are executed between the terminal 10 and the AP 6 when the terminal 10 captures this QR Code. As a result, the AP 6 stores a public key APK2 and a private key ask2 of the AP 6 (see T216 of FIG. 4), and further stores the AP-CO received from the terminal 10 (see T312 of FIG. 5). The AP-CO includes a SC for AP (hereafter, "AP-SC") and a public key TPK2 of the terminal 10. This public key TPK2 is identical to the public key TPK2 included in the printer-CO. Further, the AP-SC includes a hash value HV, a group ID "Group", the public key APK2 of the AP 6, and a digital signature DSap. This hash value HV and this group ID "Group" are respectively identical to the hash value HV and the group ID "Group" included in the printer-CO. The digital signature DSap is information in which a specific value, which is obtained by hashing a combination of the hash value HV, the group ID "Group", and the public key APK2, is encrypted by the private key tsk2 of the terminal 10, and is a value different from the digital signature DSpr included in the printer-CO.

In T400, the printer 100 sends a DPP Peer Discovery Request (hereinafter abbreviated to "DReq") including the printer-SC to the AP 6 via the Wi-Fi I/F 116. This DReq is a signal requesting the AP 6 to execute authentication and send the AP-SC.

In response to receiving the DReq from the printer 100 in T400, the AP 6 executes a process for authenticating the sender of the DReq (that is, the printer 100) and the respective kinds of information in the DReq (that is, the hash value HV, the "Group", and the public key PPK2). Specifically, in T402, the AP 6 firstly executes a first AP determination process that is regarding whether or not the hash value HV and the group ID "Group" in the received printer-SC are respectively identical to the hash value HV and the group ID "Group" in the AP-SC included in the stored AP-CO. In the case of FIG. 6, the AP 6 determines "identical" in the first AP determination process, thus it determines that the authentication of the sender of the DReq (that is, the printer 100) succeeds. Here, the fact that the hash value HV in the received printer-SC is identical to the hash value HV in the AP-SC included in the stored AP-CO means that the printer-SC and the AP-SC were generated by the same device (that is, the terminal 10). As such, the AP 6 also determines that authentication of the generator of the received printer-SC (that is, the terminal 10) succeeds. Further, the AP 6 decrypts the digital signature DSpr in the received printer-SC by using the public key TPK2 of the terminal 10 included in the stored AP-CO. Since the decryption of the digital signature DSpr succeeds in the ease of FIG. 6, the AP 6 executes a second AP determination process that is regarding whether or not a specific value obtained by decrypting the digital signature DSpr is identical to a value obtained by hashing the respective kinds of information in the received printer-SC (that is, the hash value HV, the "Group", and the public key PPK2). In the case of FIG. 6, the AP 6 determines "identical" in the second AP determination process, thus it determines that the authentication of the respective kinds of information in the DReq succeeds, and executes processes from T404. The fact that the AP 6 determines "identical" in the second AP determination process means that the respective kinds of information in the received printer-SC (that is, the hash value the "Group", and the public key PPK2) has not been tampered with by a third party since the printer-CO was stored in the printer 100. On the other hand, in a case where the AP 6 determines "not identical" in the first AP determination process, in a case where the decryption of the digital signature DSpr fails, or in a case where the AP 6 determines "not identical" in the second AP determination process, the AP 6 determines that the authentication fails and does not execute the processes from T404.

Next, in T404, the AP 6 generates a connection key CK (that is, a shared key) by using the obtained public key PPK2 of the printer 100 and the stored private key ask2 of the AP 6 in accordance with the ECDH.

In T410, the AP 6 sends a DPP Peer Discovery Response (hereinafter abbreviated to "DRes") including the AP-SC to the printer 100.

In response to receiving the DRes from the AP 6 in T410 via the Wi-Fi I/F 116, the printer 100 executes a process for authenticating the sender of the DRes (that is, the AP 6) and the respective information in the DRes (that is, the hash value HV, the "Group", and the public key APK2). Specifically, in T412, the printer 100 firstly executes a first PR determination process that is regarding whether or not the hash value HV and the group ID "Group" in the received AP-SC are respectively identical to the hash value HV and the group ID "Group" in the printer-SC included in the stored printer-CO. In the case of FIG. 6, the printer 100 determines "identical" in the first PR determination process, thus it determines that the authentication of the sender of the DRes (that is, the AP 6) succeeds. The fact that the hash value HV in the received AP-SC is identical to the hash value HV in the printer-SC included in the stored printer-CO means that the printer-SC and the AP-SC were generated by the same device (that is, the terminal 10). As such, the printer 100 also determines that authentication of the generator of the received AP-SC (that is, the terminal 10) succeeds. Further, the printer 100 decrypts the digital signature DSap in the received AP-SC by using the public key TPK2 of the terminal 10 included in the stored printer-CO. Since the decryption of the digital signature DSap succeeds in the case of FIG. 6, the printer 100 executes a second PR determination process that is regarding whether or not a specific value obtained by decrypting the digital signature DSpr is identical to a value obtained by hashing the respective information in the received AP-SC (that is, the hash value HV, the "Group", and the public key APK2). In the case of FIG. 6, the printer 100 determines "identical" in the second PR determination process, thus it determines that the authentication of the information in the DRes succeeds, and executes processes from T414. The fact that the printer 100 determines "identical" in the second PR determination process means that the respective information in the received AP-SC (that is, the hash value HV the "Group", and the public key APK2) has not been tampered with by a third party since the AP-CO was stored in the AP 6. On the other hand, in a case where the printer 100 determines "not identical" in the first PR determination process, in a ease where the decryption of the digital signature DSap fails, or in a case where the printer 100 determines "not identical" in the second PR determination process, the printer 100 determines that the authentication fails and does not execute the processes from T414.

In T414, the printer 100 generates a connection key CR by using the stored private key psk2 of the printer 100 and the public key APK2 of the AP 6 in the received AP-SC in accordance with the ECDH. Here, the connection key CR generated by the AP 6 in T404 and the connection key CR generated by the printer 100 in T414 are identical to each other. Thus, the connection key CK for establishing the DPP connection is shared between the printer 100 and the AP 6.

As aforementioned, after the connection key CR is shared between the printer 100 and the AP 6, the printer 100 and the AP 6 execute the 4way-handshake communication by using the connection key CR in T420. As a result, the DPP connection is established between the printer 100 and the AP 6. When T520 is completed, the process of FIG. 6 is terminated.

Figure 7:
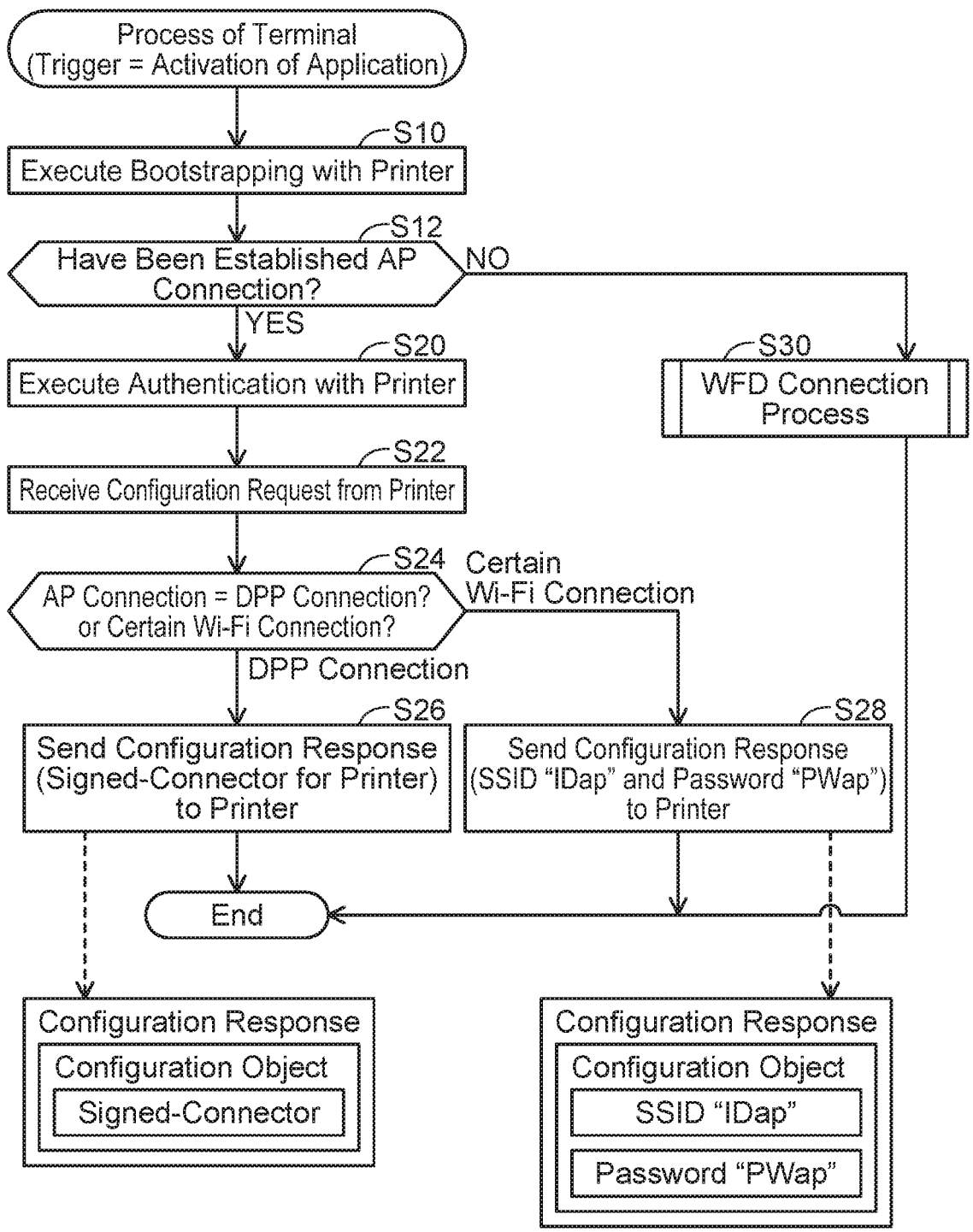
FIG. 7 shows a flowchart of processes in a terminal.

Process of Terminal; FIG. 7

The process executed by the CPU 32 of the terminal 10 will be described with reference to FIG. 7. The CPU 32 initiates the process of FIG. 7 when the application 38 is activated by the user.

In S10, the CPU 32 executes the Bootstrapping with the printer 100. That is, in response to the user's capturing a QR code displayed on the printer 100 by using the camera 20 (see T120 of FIG. 3), the CPU 32 obtains the public key PPK1 and the MAC address "macpr" of the printer 100 by decoding the QR code (see T122).

In S12, the CPU 32 determines whether the terminal 10 has been established an AP connection. Specifically, the CPU 32 determines that the AP connection has been established (YES in S12) in a ease where an AP connection flag (not shown) in the memory 34 indicates ON, and proceeds to S20. On the other hand, the CPU 32 determines as that the AP connection is not established (NO in S12) in a ease where the AP connection flag indicates OFF, and proceeds to S30.

In S20, the CPU 32 executes the Auth with the printer 100 via the Wi-Fi I/F 16 (see FIG. 4). As aforementioned, since the capability indicating that the terminal 10 is capable of operating only as the Configurator is sent in this Auth (T210 of FIG. 4), the terminal 10 is determined to operate as the Configurator (see T232) and the printer 100 is determined to operate as the Enrollee (see T234).

In S22, the CPU 32 receives the CReq from the printer 100 via the I/F 16 (see T300 of FIG. 5).

In S24, the CPU 32 determines whether the AP connection established between the terminal 10 and the AP 6 is the DPP connection or the certain Wi-Fi connection. Specifically, the CPU 32 determines that the AP connection is the DPP connection ("DPP connection" in S24) in a case where the terminal-CO including the terminal-SC is stored in the memory 34 and proceeds to S26. On the other hand, the CPU 32 determines that the AP connection is the certain Wi-Fi connection ("certain Wi-Fi connection" in S24) in a case where the SSID and the password of the wireless network formed by the AP 6 are stored in the memory 34 and proceeds to S28.

In S26, the CPU 32 generates the printer-CO including the printer-SC (see T302 to T304 of FIG. 5) and sends the CRes including this printer-CO to the printer 100 via the Wi-Fi I/F 16 (see T310). As a result, the printer 100 can establish the DPP connection with the AP 6 using this printer-CO (see FIG. 6). When the process of S26 is completed, the process of FIG. 7 is terminated.

In S28, the CPU 32 obtains the SSID "IDap" and the password "PWap" of the wireless network formed by the AP 6 from the memory 34, generates the printer-CO including the obtained SSID "Map" and password "PWap", and sends the CRes including this printer-CO to the printer 100 via the Wi-Fi I/F 16. As a result, the printer 100 can use this printer-CO and establish the certain Wi-Fi connection with the AP 6. When the process of S28 is completed, the process of FIG. 7 is terminated.

Figure 8:
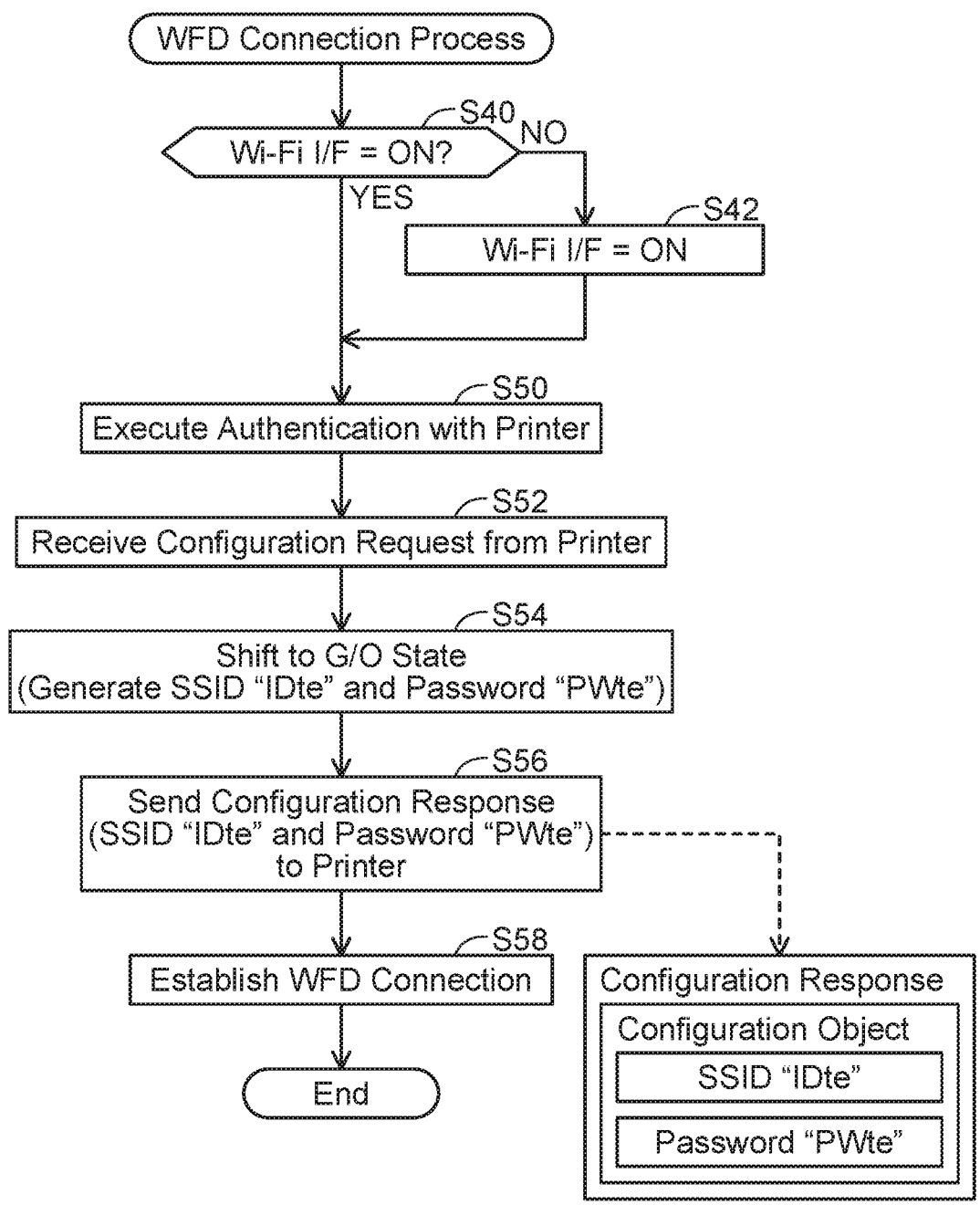
FIG. 8 shows a flowchart of a WPD connection process.

WFD Connection Process (S30 of FIG. 7); FIG. 8

Next, the WFD connection process of S30 of FIG. 7 will be described with reference to FIG. 8.

In S40, the CPU 32 determines whether or not the Wi-Fi I/F 16 is ON. The CPU 32 determines that the Wi-Fi I/F 16 is ON (YES in S40) in a case where a Wi-Fi state flag (not shown) in the memory 34 indicates ON and proceeds to S50. On the other hand, the CPU 32 determines that the Wi-Fi I/F 16 is not ON OFF) (NO in S40) in a case where the Wi-Fi state flag indicates OFF, and proceeds to S42.

In S42, the CPU 32 causes the state of the Wi-Fi I/F 16 to shift, from OFF to ON. Specifically, the CPU 32 instructs the OS program 36 to cause the state of the Wi-Fi I/F 16 to shift from OFF to ON according to the application 38. Then, the CPU 32 causes the state of the Wi-Fi I/F 16 to shift from OFF to ON in accordance with the OS program 36. Accordingly, the terminal 10 shifts to a state being able to execute various types of communication with other devices via the Wi-Fi I/F 16.

S50 and S52 are similar to S20 and S22 of FIG. 7, That is, in the Auth of S50, since the capability indicating that the terminal 10 can operate only as the Configurator is sent, the terminal 10 is determined to operate as the Configurator and the printer 100 is determined to operate as the Enrollee. After this, in S54, the CPU 32 causes the state of the terminal 10 to shift from the device state to the G/O state of the WFD. Then, the CPU 32 generates a SSID "IDte" and a password "PWte" of a wireless network formed by the terminal 10 operating in the G/O state.

In S56, the CPU 32 generates the printer-CO including the SSID "IDte" and the password "PWte" generated in S54 and sends the CRes including this printer-CO to the printer 100 via the Wi-Fi I/F 16.

In S58, the CPU 32 executes various types of communication according to the WFD, such as the Authentication, Association, and 4-way handshake via the Wi-Fi I/F 16 with the printer 100. Then, the CPU 32 executes authentication using the SSID "IDte" and the password. "PWte" in the course of executing the various types of communication, and in a case where this authentication is successful, the CPU 32 establishes the WFD connection with the printer 100. Accordingly, a wireless network to which both the terminal 10 and the printer 100 belong is formed. In this wireless network, the terminal 10 operates as the G/O (i.e., parent station) and the printer 100 operates as the child station (CL or so-called legacy). When the process of S58 is completed, the process of FIG. 8 is terminated.

Figure 9:
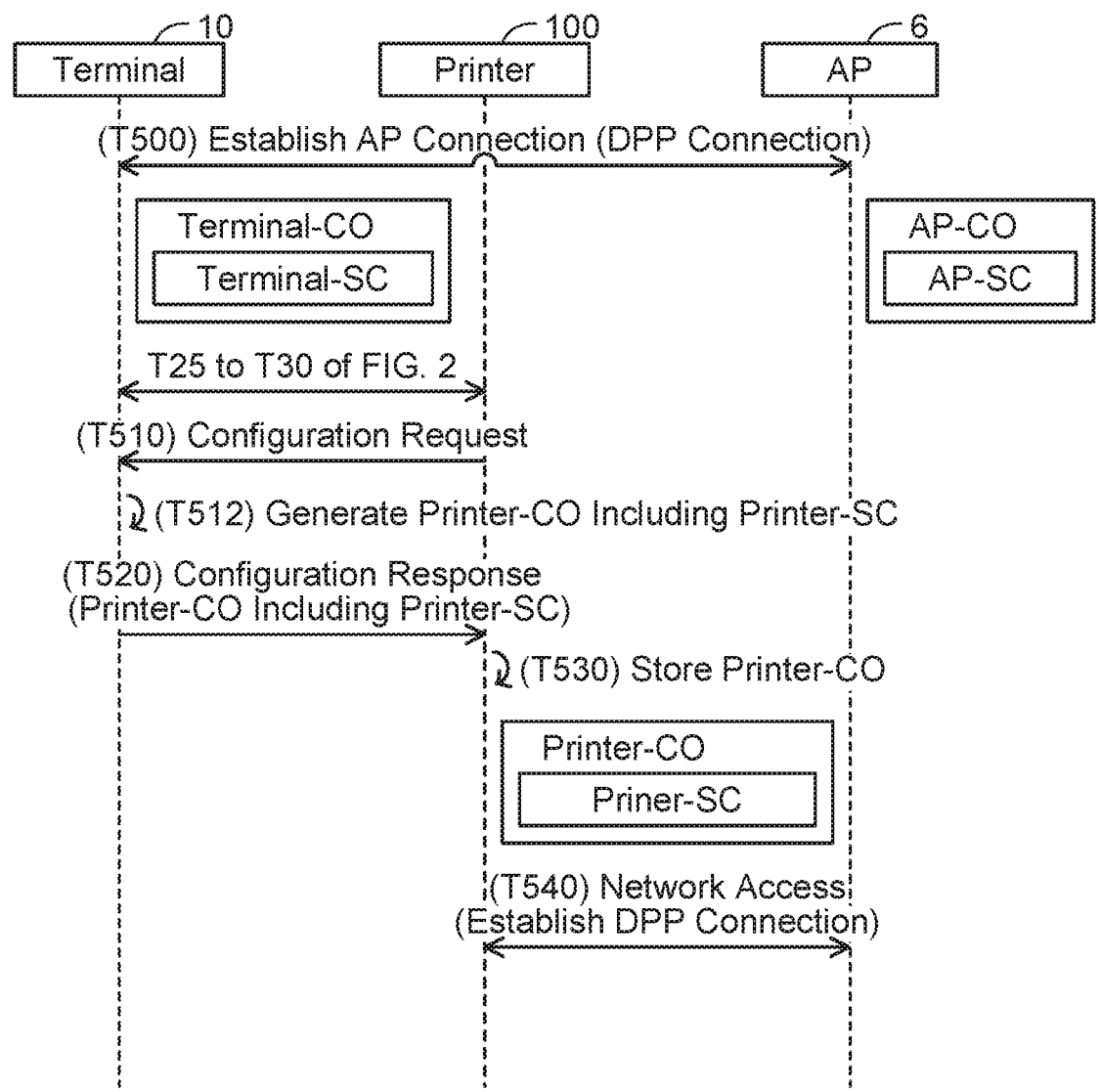
FIG. 9 shows a sequence diagram of Case A in which a DPP connection is established between the printer and the access point in a situation where a DPP connection is established between the terminal and the access point.

Case A; FIG. 9

Next, specific cases realized by the processes of FIGS. 7 and 8 will be described. Firstly, Case A in which the DPP connection is established between the printer 100 and the AP 6 in a situation where the DPP connection has been established between the terminal 10 and the AP 6 will be described with reference to FIG. 9. As shown in T500, the DPP connection has been established between the terminal 10 and the AP 6 (see T5 to T20 of FIG. 2). As such, the terminal 10 stores the terminal-CO including the terminal-SC, and the AP 6 stores the AP-CO including the AP-SC.

Under such a situation, the BS and Auth are executed between the terminal 10 and the printer 100 similar to T25 to T30 of FIG. 2 (S10, YES in S12, S20 of FIG. 7). After this, when the CReq is received from the printer 100 in T510 (S22), the terminal 10 determines that the AP connection is the DPP connection ("DPP connection" in S24). In this case, the terminal 10 generates the printer-CO including the printer-SC in T512, and sends the CRes including this printer-CO to the printer 100 in T520 (S26).

When the CRes is received from the terminal 10 in T520, the printer 100 stores the printer-CO included in the CRes in T530, and establishes the DPP connection with the AP 6 using the printer-CO (more specifically the printer-SC) in T540 (see FIG. 6).

Figure 10:
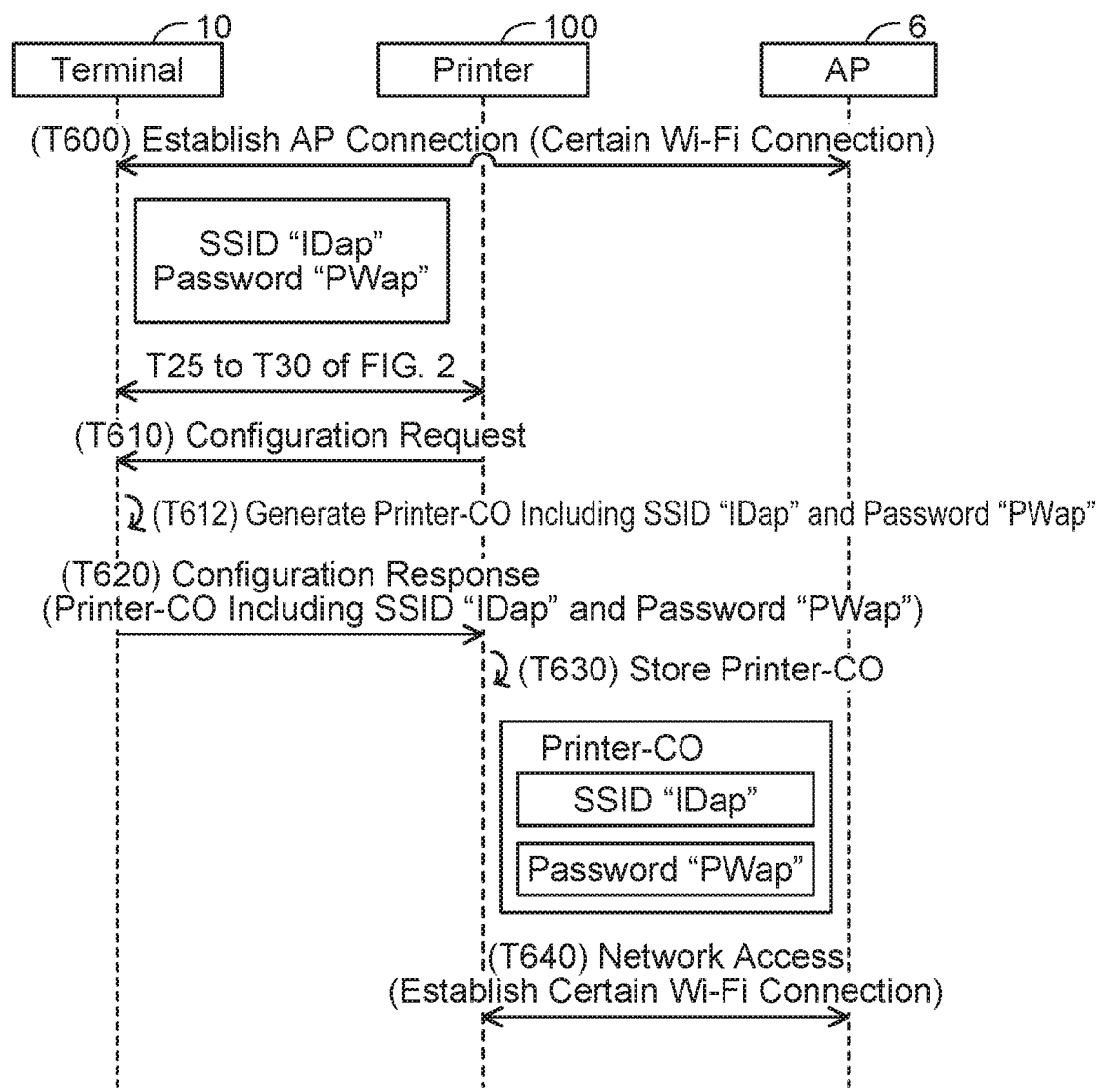
FIG. 10 shows a sequence diagram of Case B in which a certain Wi-Fi connection is established between the printer and the access point in a situation where a certain Wi-Fi connection is established between the terminal and the access point.

Case B; FIG. 10

Next, Case B in which the certain Wi-Fi connection is established between the printer 100 and the AP 6 in a situation where the certain Wi-Fi connection has been established between the terminal 10 and the AP 6 will be described with reference to FIG. 10. As shown in T600, the certain Wi-Fi connection has been established between the terminal 10 and the AP 6. As such, the terminal 10 stores the SSID "IDap" and the password "PWap" of the network formed by the AP 6.

Under such a situation, the BS and Auth are executed between the terminal 10 and the printer 100 similar to T25 to T30 of FIG. 2 (S10, YES in 812, S20 of FIG. 7). After this, when the CReq is received from the printer 100 in T610 (822), the terminal 10 determines that the AP connection is the certain connection ("certain Wi-Fi connection" in S24). In this case, the terminal 10 generates the printer-CO including the S811) "IDap" and the password "PWap" in T612, and sends the CRes including this printer-CO to the printer 100 in T620 (S28).

When the CRes is received from the terminal 10 in T620, the printer 100 stores the printer-CO included in the CRes in T630, and establishes the certain Wi-Fi connection with the AP 6 using the printer-CO (more specifically, the SSID "IDap" and the password "PWap") in T640.

Figure 11:
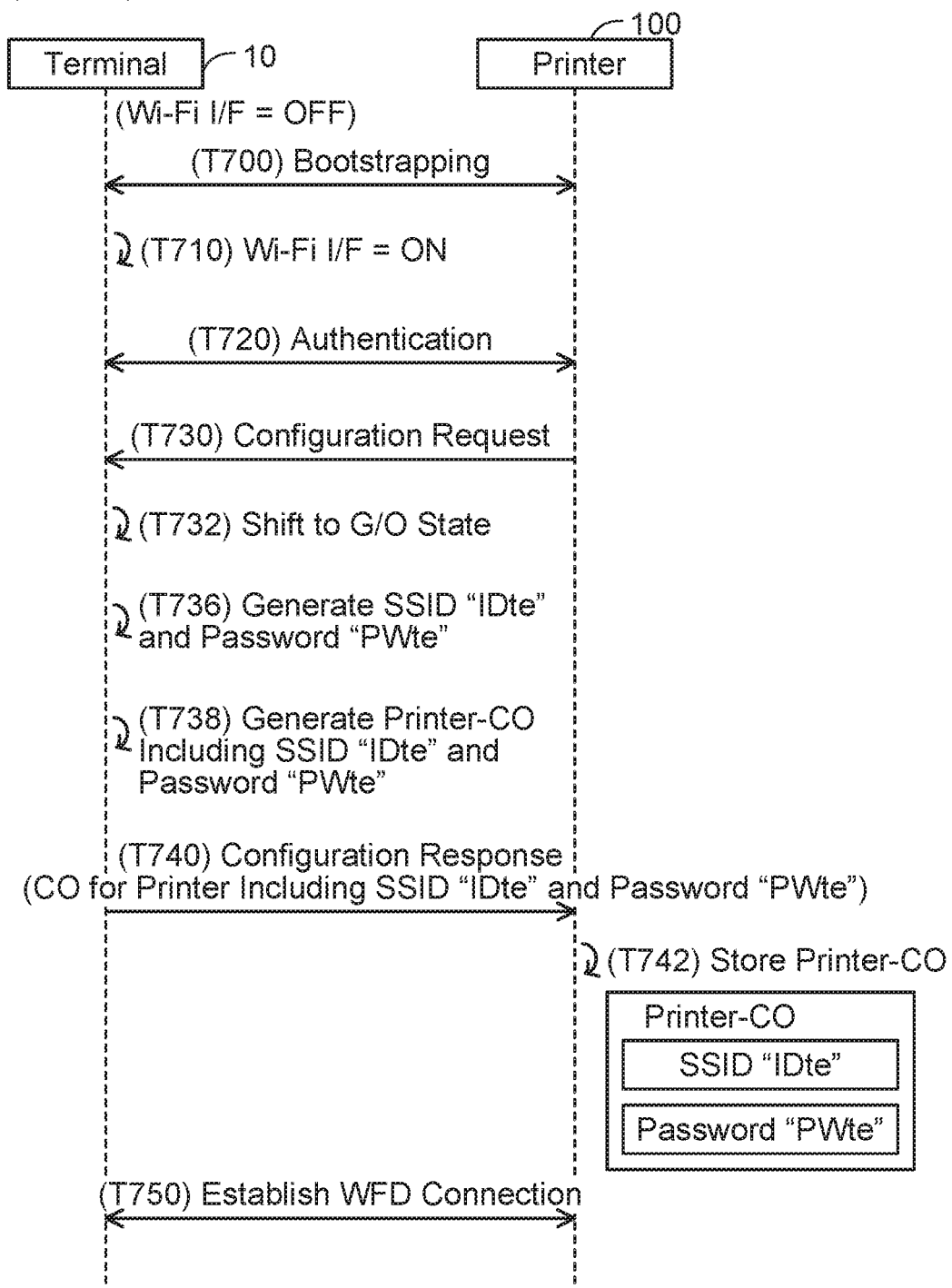
FIG. 11 shows a sequence diagram of Case C in which a WFD connection is established between the terminal and the printer in a situation where no Wi-Fi connection is established between the terminal and the access point.

Case C; FIG. 11

Next, Case C in which the WFD connection is established between the terminal 10 and the printer 100 in a situation where the terminal 10 has not been established any AP connection will be described with reference to FIG. 11. In an initial state of FIG. 11, the Wi-Fi I/F 16 of the terminal 10 is OFF and the terminal 10 has not been established any AP connection.

When the BS with the printer 100 is executed in T700 (810 of FIG. 7), the terminal 10 determines that no AP connection has been established (NO in S12). Further, the terminal 10 determines that the Wi-Fi I/F 16 is OFF (NO in S40 of FIG. 8). In this case, the terminal 10 causes the state of the Wi-Fi I/F 16 to shift from OFF to ON in T710 (S42).

After this, the terminal 10 executes the Auth with the printer 100 in T720 (S50) and receives the CReq from the printer 100 in T730 (S52). In this case, the terminal 10 shifts from the device state to the G/O state of the WFD in T732 (S54). Then, the terminal 10 generates the SSID "IDte" and the password "PWte" in T736 (S54), generates the printer-CO including the SSID "IDte" and the password "PWte" in T738, and sends the CRes including this printer-CO to the printer 100 in T740 (S56).

When the CRes is received from the terminal 10 in T740, the printer 100 stores the printer-CO included in the CRs in T742, and establishes the WFD connection with the terminal 10 using the printer-CO (more specifically, the SSID "IDte" and the password "PWte") in T750. Accordingly, the terminal 10 and the printer 100 can execute communication of data representing a print target image, for example, not via the AP 6.

Effects of Embodiment

According to the present embodiment, the terminal 10 determines whether or not the AP connection has been established (S12 of FIG. 7) after having executed the BS with the printer 100 and before the AReq is sent to the printer 100. In the case of determining that the AP connection has been established (YES in S12, Case A of FIG. 9, Case B of FIG. 10), the terminal 10 sends the CRes including the printer-CO to the printer 100 for establishing the AP connection (S26, S28, T520 of FIG. 9, T620 of FIG. 10). Accordingly, the AP connection can be established between the printer 100 and the AP 6 (T540 of FIG. 9, T640 of FIG. 10). Further, in the case of determining that no AP connection has been established (NO in S12, Case C of FIG. 11), the terminal 10 sends the CRes including the printer-CO to the printer 100 for establishing the WFD connection with the terminal 10 (S56 of FIG. 8, T740 of FIG. 11), and establishes the WFD connection with the printer 100 (S58, T750). As such, the wireless connection can be established between the printer 100 and another suitable device (i.e., the AP 6 or the terminal 10) according to whether the terminal 10 has been established the AP connection.

Further, in the case of determining that the AP connection has been established, the terminal 10 determines whether this AP connection is the DPP connection or the certain Wi-Fi connection (S24 of FIG. 7). Then, the terminal 10 sends the printer-CO including the printer-SC to the printer 100 (S26) in the case of determining that the AP connection is the DPP connection. The terminal 10 sends the printer-CO including the SSID "IDap" and the password "PWap" to the printer 100 (S28) in the case of determining that the AP connection is the certain Wi-Fi connection. As above, the printer-CO capable of suitably establishing the AP connection can be sent to the printer 100 according to whether the terminal 10 has been established the DPP connection with the AP 6 or has been established the certain Wi-Fi connection with the AP 6.

Further, even in a case where no AP connection is currently established, if the AP connection with a specific AP had been established in the past, it is possible that the terminal 10 stores information for establishing the AP connection with the specific AP (terminal-SC or SSID and password). A comparative example will be assumed in which, in a situation where the terminal 10 has not been established any AP connection, the printer-CO generated based on the aforementioned information is sent from the terminal 10 to the printer 100. In the comparative example, the printer 100 attempts to establish the AP connection with the specific AP using this printer-CO. However, in a situation where the specific AP is not present near the printer 100, the printer 100 cannot establish the AP connection with the specific AP. As a result, a wasteful printer-CO is sent to the printer 100. Further, in a situation where the specific AP is present near the printer 100, the printer 100 may establish the AP connection with the specific AP. However, since the terminal 10 has not been established the AP connection with the specific AP, communication cannot be executed between the terminal 10 and the printer 100 via the specific AP. As such, a wasteful printer-CO is sent to the printer 100 in this case as well.

Contrary to this, in the present embodiment, the terminal 10 does not send the printer-CO including the information to the printer 100 for establishing the AP connection in the ease of determining that the terminal 10 has not been established any AP connection, and instead sends the printer-CO to the printer 100 for establishing the WM connection with the terminal 10. Accordingly, the WFD connection is established between the terminal 10 and the printer 100, so communication can be executed between the terminal 10 and the printer 100 not via the AP. Thus, a wasteful printer-CO can be suppressed from being sent to the printer 100. Especially, since the terminal 10 does not send the information regarding the AP with which the AP connection was established in the past to the printer 100, this information can be suppressed from being externally leaked. Accordingly, security of a wireless network formed by this AP can be suppressed from being degraded.

Especially, in the case of determining that no AP connection has been established, the terminal 10 sends the printer-CO including the SSID "IDte" and the password "PWte" of the network in which the terminal 10 operates as the G/O to the printer 100. Accordingly, the printer 100 can operate as a child station in this wireless network. As compared to a case in which the printer 100 operates as the G/O, processing load on the printer 100 can be reduced.

Further, in the case of executing the BS with the printer 100, the terminal 10 causes the state of the Wi-Fi I/F 16 to shift from OFF to ON automatically (T710 of FIG. 11) without accepting an operation of the user for changing the state of the Wi-Fi I/F 16. Accordingly, the terminal 10 can suitably execute the various types of communication including the Auth and Config with the printer 100 via the Wi-Fi I/F 16 (T720 to T740). Thus, the terminal 10 can suitably establish the WFD connection with the printer 100 (T750).

Further, the terminal 10 operates as the Configurator in both the case of determining that the AP connection has been established and the case of determining that no AP connection has been established (S20 of FIG. 7, S50 of FIG. 8). As a result, the printer 100 does not have to generate any CO in the Config executed between the terminal 10 and the printer 100, the processing load on the printer 100 can be reduced.

Corresponding Relationship

The terminal 10 and the printer 100 are respectively an example of a "terminal device" and a "communication device". The Wi-Fi I/F 16 is an example of a "wireless interface". The printer-CO including the printer-SC and the printer-CO including the SSID "Map" and the password "PWap" are examples of "first connection information". The printer-CO including the SSID "IDte" and the password "PWte" is an example of "second connection information" and "connection information". The DPP connection and the certain Wi-Fi connection are respectively an example of a "first-type wireless connection" and a "second-type wireless connection". The wireless network formed by the AP 6 and the wireless network formed by the terminal 10 operating as the G/O are respectively an example of a "first wireless network" and a "second wireless network (or wireless network)".

The process of S10, the process of S12, and the process of S24 of FIG. 7 are respectively an example of "obtain a public key", "determine whether the terminal device has been established a wireless connection with an access point", and "determine whether the wireless connection with the access point is a First-type wireless connection or a second-type of wireless connection". The process of S20 and the process of S50 of FIG. 8 are an example of "send an authentication request" and "receive an authentication response". The process of S26 and the process of S28 are an example of "send first connection information". The process of S42, the process of S56, and they process of S58 of FIG. 8 are respectively an example of "execute a process for shifting a state of the wireless interface", "communicate second connection information (or communicate connection information)", and "establish the wireless connection".

(Variant 1) Each of the terminal 10 and the printer 100 may further include a wireless interface (such as Bluetooth (BT) (Registered Trademark, BLUETOOTH SIG, INC.) I/F and Near Field Communication (NFC) I/F according to a wireless protocol different from the Wi-Fi protocol (e.g., BT protocol and an NEC protocol). In this case, the printer 100 may send the DPP information including the public key PPK1 and the MAC address via the BT of the printer 100 instead of displaying the QR Code in T100 of FIG. 3. In this case, the terminal 10 can receive the DPP information via the BT I/F of the terminal 10. Further, in another variant, the printer 100 may send the DPP information via the NFC I/F of the printer 100. In this case, the terminal 10 can receive the DPP information via the NFC I/F of the terminal 10. In general terms, how a public key of a communication device is obtained in "obtain a public key" is not particularly limited.

(Variant 2) In the case of determining that no AP connection has been established, the terminal 10 may send the AReq including the capability indicating that the terminal 10 operates only as the Enrollee to the printer 100. In this case, the terminal 10 is determined to operate as the Enrollee and the printer 100 is determined to operate as the Configurator. As such, the terminal 10 sends the CReq to the printer 100, and the printer 100 shifts to the G/O state. In this case, the terminal 10 receives the CRes including the terminal-CO including a SSID and a password of a wireless network in which the printer 100 operates as the G/O state from the printer 100. Then, the terminal 10 uses these SSID and password to establish the WFD connection with the printer 100, and operates as a child station in the wireless network. That is, "communicate second connection information (or communicate connection information)" may send the second connection information (such as the printer-CO) to the communication device as in the aforementioned embodiment, and may receive the second connection information (such as the terminal-CO) from the communication device. In general terms, "communicate second connection information (or communicate connection information)" simply needs to communicate the second connection information with the communication device. Further, as described in this variant, the terminal device may operate as a child station and the communication device may operate as a parent station in the "second wireless network (or wireless network)".

(Variant 3) The terminal 10 may not support the WFD, and may support a so-called SoftAP protocol. In this ease, in the case of determining that no AP connection has been established, the terminal 10 may operate as a SoftAP in response to receiving the CReq in T730 of FIG. 11, for example. In this variant, the SoftAP is an example of the "parent station state".

(Variant 4) in the case of determining that no AP connection has been established, the terminal 10 may send the printer-CO including information for establishing a wireless connection in compliance with an adhoc protocol to the printer 100. In this variant, the printer-CO including this information is an example of the "second connection information". In general terms, the "second connection information" may simply be information for establishing a wireless connection between the terminal device and the communication device not via any access point.

(Variant 5) The determination of S12 of FIG. 7 may be executed before the BS with the printer 100 or may be executed after the Auth with the printer 100. In general terms, a timing to "determine whether the terminal device has been established a wireless connection with an access point" is not particularly limited.

(Variant 6) In a system that is on a premise that the terminal 10 is not capable of establishing the certain Wi-Fi connection with the AP 6 but is capable of establishing the DPP connection with the AP 6, S24 and S28 of FIG. 7 may be omitted. Further, in a system that is on a premise that the terminal 10 is not capable of establishing the DPP connection with the AP 6 but is capable of establishing the certain connection with the AP 6, S24 and S26 of FIG. 7 may be omitted. In this variant, "determine whether the wireless connection with the access point is a first-type wireless connection or a second-type wireless connection" may be omitted.

(Variant 7) In a system that is on a premise that the Wi-Fi I/F 16 of the terminal 10 is ON at all times, S40 and S42 of FIG. 8 may be omitted. In this variant, "execute a process for shifting a state of the wireless interface" may be omitted.

(Variant 8) The terminal 10 may not support the DPP, and may obtain the public key of the printer 100 and execute the various types of communication such as the authentication request, the authentication response, and the connection information in compliance with a protocol different from the DPP.

(Variant 9) The "communication device" may not be the printer 100, but may be another device such as a scanner, a multi-function peripheral, a portable terminal, a PC, and a server.

(Variant 10) In the above embodiments, the respective processes of FIGS. 2 to 11 are executed by software (such as the application 38), however, at least one of these processes mays be realized by hardware such as a logic circuit.

What is claimed is:

1. A terminal device comprising:
   a wireless interface configured to execute wireless communication according to Wi-Fi standard; and
   a controller configured to:
   obtain a public key of a communication device;
   determine whether the terminal device has a current wireless connection with an access point, where the access point is a different device from the communication device;
   send an authentication request in which the public key is used to the communication device via the wireless interface;
   receive an authentication response from the communication device via the wireless interface;
   in a case where it is determined that the terminal device has the current wireless connection with the access point, send first connection information to the communication device via the wireless interface after the authentication response has been received from the communication device, the first connection information being for establishing a wireless connection between the communication device and the access point;
   in a case where it is determined that the terminal device does not have the current wireless connection with the access point, communicate second connection information with the communication device via the wireless interface after the authentication response has been received from the communication device, the second connection information being for establishing a wireless connection between the terminal device and the communication device not via the access point; and
   establish the wireless connection between the terminal device and the communication device by using the second connection information via the wireless interface after the second connection information has been communicated with the communication device.

2. The terminal device as in claim 1, wherein
the controller determines whether the terminal device has the current wireless connection with the access point after the public key has been obtained and before the authentication request is sent to the communication device.

3. The terminal device as in claim 1, wherein
the public key is obtained by executing Bootstrapping according to a Device Provisioning Protocol (DPP) of the Wi-Fi standard, the authentication request is a DPP Authentication Request, the authentication response is a DPP Authentication Response, the first connection information is a first Configuration Object for establishing the wireless connection between the communication device and the access point, and the second connection information is a second Configuration Object for establishing the wireless connection between the terminal device and the communication device not via the access point.

4. The terminal device as in claim 3, wherein the terminal device operates as a Configurator according to the DPP after the authentication response has been received from the communication device, and the controller sends the second connection information that is the second Configuration Object to the communication device.

5. The terminal device as in claim 3, wherein the controller is further configured to:

in the case where it is determined that the terminal device has the current wireless connection with the access point, determine whether the current wireless connection with the access point is a first-type wireless connection or a second-type wireless connection, wherein the first-type wireless connection is in compliance with the DPP, and the second-type wireless connection is in compliance with a first wireless network in which the access point operates as a parent station using a Service Set Identifier (SSID) and a password, wherein in a case where it is determined that the current wireless connection with the access point is the first-type wireless connection, the controller sends the first connection information that is the first Configuration Object including a Signed-Connector according to the DPP to the communication device, and in a case where it is determined that the current wireless connection with the access point is the second-type wireless connection, the controller sends the first connection information that is the first Configuration Object including the SSID and the password of the first wireless network to the communication device.

6. The terminal device as in claim 1, wherein the controller sends the second connection information that includes a Service Set Identifier (SSID) and a password of a second wireless network in which the terminal device operates as a parent station to the communication device, the controller establishes the wireless connection between the terminal device and the communication device by using the second connection information via the wireless interface after the second connection information has been sent to the communication device, and in a case where the wireless connection between the terminal device and the communication device is established, the communication device operates as a child station in the second wireless network.

7. The terminal device as in claim 1, wherein the controller is further configured to:

in a case where the public key is obtained and it is determined that the terminal device does not have the current wireless connection with the access point, execute a process for shifting a state of the wireless interface from a state in which the wireless interface is unable to execute the wireless communication via the wireless interface to a state in which the wireless interface is able to execute the wireless communication via the wireless interface, wherein the controller sends the authentication request to the communication device via the wireless interface after the state of the wireless interface has been shifted to the state in which the wireless interface is able to execute the wireless communication.

8. A non-transitory computer-readable recording medium storing computer readable instructions for a terminal device, wherein the terminal device comprises:
 a wireless interface configured to execute wireless communication according to Wi-Fi standard; and
 a processor, the computer-readable instructions, when executed by the processor, cause the terminal device to:

obtain a public key of a communication device;

determine whether the terminal device has a current wireless connection with an access point, where the access point is a different device from the communication device;

send an authentication request in which the public key is used to the communication device via the wireless interface;

receive an authentication response from the communication device via the wireless interface;

in a case where it is determined that the terminal device has the current wireless connection with the access point, send first connection information to the communication device via the wireless interface after the authentication response has been received from the communication device, the first connection information being for establishing a wireless connection between the communication device and the access point;

in a case where it is determined that the terminal device does not have the current wireless connection with the access point, communicate second connection information with the communication device via the wireless interface after the authentication response has been received from the communication device, the second connection information being for establishing a wireless connection between the terminal device and the communication device not via the access point; and establish the wireless connection between the terminal device and the communication device by using the second connection information via the wireless interface after the second connection information has been communicated with the communication device.

* * * * *